(12) United States Patent  
Mirho

(10) Patent No.: US 9,363,360 B1
(45) Date of Patent: Jun. 7, 2016

(54) TEXT MESSAGE DEFINITION AND CONTROL OF MULTIMEDIA

(71) Applicant: FSP LLC, Vancouver, WA (US)

(72) Inventor: Charles A Mirho, Lake Oswego, OR (US)

(73) Assignee: FSP LLC, Lake Oswego, OR (US)

( * ) Notice: Subject to any disclaimer, the term of this patent is extended or adjusted under 35 U.S.C. 154(b) by 0 days.

(21) Appl. No.: 14/720,887

(22) Filed: May 25, 2015

Related U.S. Application Data

(63) Continuation of application No. 13/762,340, filed on Feb. 7, 2013, now Pat. No. 9,042,923.

(60) Provisional application No. 61/596,721, filed on Feb. 8, 2012, provisional application No. 61/622,957, filed on Apr. 11, 2012, provisional application No. 61/653,583, filed on May 31, 2012, provisional application No. 61/665,344, filed on Jun. 28, 2012, provisional application No. 61/684,185, filed on Aug. 17, 2012.

(51) Int. Cl.
| | |
|---|---|
| *H04W 4/00* | (2009.01) |
| *H04M 1/725* | (2006.01) |
| *H04W 4/14* | (2009.01) |
| *H04L 12/58* | (2006.01) |

(52) U.S. Cl.
CPC ............ *H04M 1/72552* (2013.01); *H04L 51/10* (2013.01); *H04W 4/14* (2013.01)

(58) Field of Classification Search
CPC ............ H04W 4/10; H04W 4/12; H04W 4/14; H04W 12/5895; H04W 76/005; H04W 4/04; H04W 4/18; H04W 80/12; H04H 60/33; H04L 29/0818; H04L 12/585; H04L 29/06; G06Q 10/10
USPC ........ 455/412.1, 412.2, 413, 414.1, 517, 518, 455/466; 709/201, 206, 207
See application file for complete search history.

(56) References Cited

U.S. PATENT DOCUMENTS

| | | | | |
|---|---|---|---|---|
| 7,945,634 B1 * | 5/2011 | Huda | ...................... | G06Q 30/02 709/206 |
| 2006/0167992 A1 * | 7/2006 | Cheung | ................. | G06F 17/241 709/204 |
| 2008/0313534 A1 * | 12/2008 | Cheung | ................. | G06F 17/241 715/254 |
| 2009/0124268 A1 * | 5/2009 | McNamara | ............ | G06Q 30/02 455/466 |

* cited by examiner

*Primary Examiner* — Amancio Gonzalez
(74) *Attorney, Agent, or Firm* — FSP LLC

(57) ABSTRACT

A communication system, including logic to expand a text message into a web page and to provide a link to the web page to a recipient device.

19 Claims, 15 Drawing Sheets cb
? (2) w(6)

Scope rules for emoticons
 local
 global
 defined explicitly (e.g.,
 with parentheses)

FIG. 11

(a) different web pages
(b) different frames
(c) other display-distinct region

TEXT MESSAGE DEFINITION AND CONTROL OF MULTIMEDIA

PRIORITY

This application claims priority under 35 U.S.C 119 to the following USA provisional applications, each of which is incorporated herein by reference in their entirety:
U.S. 61/596,721 filed on Feb. 8, 2012
U.S. 61/622,957 filed on Apr. 11, 2012
U.S. 61/653,583 filed on May 31, 2012
U.S. 61/665,344 filed on Jun. 28, 2012
U.S. 61/684,185 filed on Aug. 17, 2012

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

FIGS. 10, 11, and 13 illustrate embodiments of techniques for delimiting display regions for content in one or more web pages generated from a text message.

Figure 1:
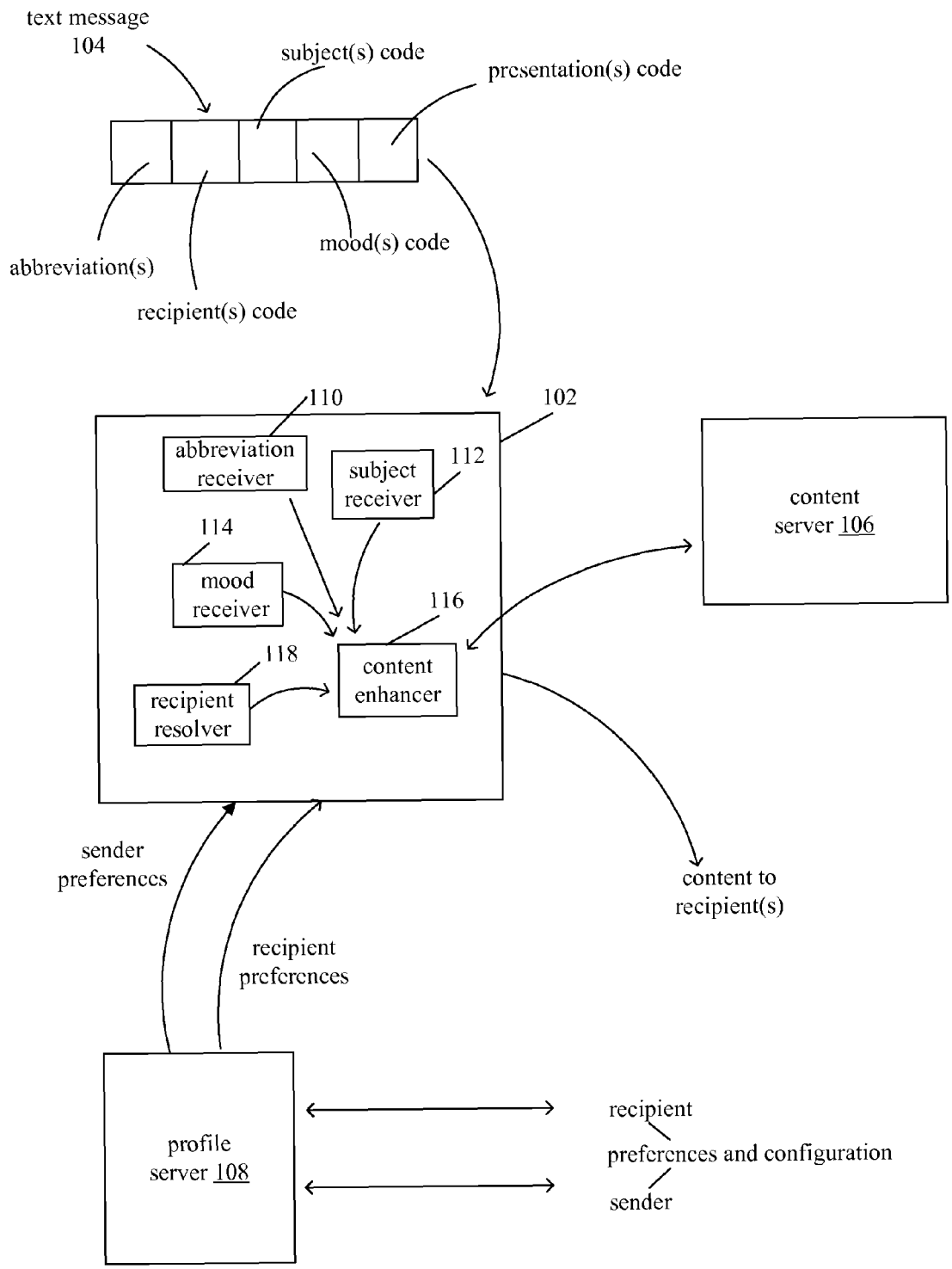
FIG. 1 is an illustration of an embodiment of runtime system logic for expanding text messages into larger (with more content) messages, multiple messages, and/or multimedia messages.

a. DETAILED DESCRIPTION b. Preliminaries c. References to "one embodiment" or "an embodiment" do not necessarily refer to the same embodiment, although they may.

d. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. References to "or" among elements indicates one or more of the elements, unless the context indicates otherwise.

e. "Logic" refers to machine memory circuits, machine readable media, and/or circuitry which by way of its material and/or material-energy configuration comprises control and/or procedural signals, and/or settings and values, that may be applied to influence the operation of a device. Magnetic media, electronic circuits, electrical and optical memory (both volatile and nonvolatile), and firmware are examples of logic.

f. Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation. Various logic blocks described herein for expanding text messages may be implemented by those having skill in the art, using familiar tools such as one or more (sequential or nested) regular expression ("regex") parsers/analyzers; and/or lexical parsers and analyzers such as yacc, lex, flex, shlex, and Bison.

a. The following description uses text messages by way of example. Those skilled in the art will recognize that the described techniques may be applied to email systems and email-text communication without undue experimentation.

b. SMS stands for Short Message Service and is the most widely used type of text messaging. With a SMS, a device can send a message of up to 160 characters to another device. Longer messages can be split up into several parts. Most cell phones support this type of text messaging, and sending a SMS is usually inexpensive. SMSs can also be used to access various services from a portable device, such as Google and MSN.

c. EMS stands for Enhanced Messaging Service and is an extension of the SMS. It provides SMS with functionalities such as text formatting (bold or italic fonts) and limited picture and animation support. If an EMS is sent to a phone that doesn't support it, it will display as a standard SMS. EMS may at some point be rendered obsolete by MMS.

d. MMS stands for Multimedia Messaging Service and this type of text messaging is an evolution of the SMS. With a MMS, a message may include pictures, video or audio. Most new cell phones with multimedia capabilities support MMS.

Text Message Expansion System

A text message may be expanded according to rules that may or may not vary by the sender, recipient(s), or other factors as set forth below. Herein a "text message" means a message that conforms to the features and limitations of the Short Message Service (SMS) for mobile wireless devices. The text message comprises an encoding which may be expanded into content including non-textual (e.g. images, icons, music, sound, video, animation) content, or expanded into multiple messages or even interactive sessions between sender and recipient(s). "Encoding" means one or more symbols representing a larger (i.e. requiring more bits to store or communicate) amount of content. For example "hi(R)" may be an encoding for "Hello Rachael", where Rachael is the name of a message recipient. "Expanded" means replacing encodings with the larger content they represent. A "symbol" is any display character that may be part of a text message and is not limited to alphanumerics. "Content" refers to logic that may be applied to a machine display (e.g. LCD, monitor, flat screen) or machine sound-generating devices (e.g. speakers) in order to generate visual (e.g. text, images, icons, videos, animations) or audible information (e.g. music, sounds). "Sender" is logic embodying information about the user of a device that initiates a message. "Receiver" or "recipient" is logic embodying information about a user of a device that receives a message.

Referring to FIG. 1, a runtime system 102 for text message expansion may comprise logic to expand a text message 104 into additional content and direct it to specified recipients. By way of example, the expansion may be affected and varied differently for the same encoding, depending on factors such as the sender, the recipient, the environment (defined more fully below), and other factors.

In one embodiment, the body of a text message 104 encodes a subject of the message and/or a mood. Herein "body of a text message" refers to the bulk portion of the text message that comprises the message data, e.g. not the recipients which typically comprise addresses to which to direct the messages. A distinction is thus made in this disclosure between the conventional "recipients" specified for a text message, and recipient encodings which are comprised by the text message body. A recipient encoding in the text message body may be expanded into a recipient address as used by conventional text messaging systems. A "recipient address" is a communication network address sufficient for directing a text message to an end user device of the recipient. As illustrated in this example, a logic block "recipient resolver" 118 may perform the function of mapping recipient codes in a text message to recipient addresses.

The "subject" and "mood" of a message may be encodings that identify categories of content and feelings to convey in the message 104. Examples of subjects are "Mother's Day", "Bowling Night", "Politics", "The Environment", and so on. In general, "subjects" may correspond to standard taxonomies (hierarchical classifications) for different personal, social, or business contexts. Examples or "mood" are "happy", "sad", "angry", "tired", "celebrating", "relaxing", and so on. A mood may be encoded using an emoticon. In a single text message, multiple items of media content (an image, a sound, a textual sentence or word or phrase, a video) may each be associated with a different mood using different emoticons. The emoticons may define the mood of the media content that is selected and displayed in a web page. As illustrated in this example, logic blocks "mood receiver" 114 and "subject receiver" 112 may perform the functions of mapping mood and subject codes in a text message to media content for moods and subjects, respectively.

The text message may also encode presentation options, such as effects for presenting images (dissolve, slide from left or right, rotate, etc) or sound (play fast, play slow, volume) or video or animation. Presentation options for text (bold, big, underline, font, etc) may also be encoded. As illustrated in this example, a logic block "content enhancer" 116 may perform the function of mapping presentation codes in a text message to presentation features for enhanced content. The content enhancer 116 may also interface and interact with other logic blocks in the runtime system 102 in order to construct and communicate the enhanced content based on the received text message 104.

Various encodings in a text message 104 may be expanded using processes dedicated to those particular encoding types. For example, abbreviations may be expanded by abbreviation receiver logic 110, subjects by subject receiver logic 112, moods by mood receiver logic 114, and encoded recipients by recipient resolver logic 118. Such an implementation is not required, but may be preferred due to its modularity and maintainability.

A sender of a message or someone else may configure an expansion file that defines rules for expanding text messages. Different expansion files for the same sender may be provided for different recipients. The expansion files may be communicated to and stored by the recipient end user devices (e.g. the computer, cell phone, music player, personal digital assistant, Blackberry®, or other device that receives text message for the recipient). Alternatively or additionally, the expansion files may be stored by an intermediate messaging server. Herein, an "expansion file" refers to logic embodying expansion content or rules for expanding text messages. An expansion file may be stored by an end user (i.e. sender or recipient) device or intermediate message server in a conventional and well-understood machine file system. However, "expansion file" is not by definition limited to conventional electronic/optical machine file logic, nor due to the fungible nature of logic is it limited to a single "file" necessarily stored on a single device. In the illustrated example, the "expansion file" logic is included within the respective modular components 110-118 of the runtime system 102.

Examples of expansion content that may be part of an expansion file have already been provided. Examples of rules for expanding text messages include logic associating an encoding with an item of content that will replace the encoding in the expanded message. In some embodiments, expansion content or rules may be incorporated by reference (e.g. logic 'pointers', Uniform Resource Locators, network addresses and so on) into an expansion file.

Expansions of text messages may be based at least in part on preferences, tastes, or demographics associated with a sender or recipient. "Preferences" means any action or thing that a person has demonstrated a preference for. For example a user may "prefer" red wine over white wine. "Tastes" are similar to preferences but apply more generally, and means any category of preferences that may be characterized with common attributes. For example "dark humor" may be characterized as a "taste" for a user if the user has shown a preference for movies or other content comprising humor of a 'dark' nature. "Demographics" means logic embodying descriptive personal information associated with a sender or recipient, such as their age, income, family size, gender, and so forth. User preferences, tastes, or demographics may be stored and managed by a profile server 108, one or more devices configured to store, organize, and dispense profile logic. Expansion content may be stored and managed by a content server 106, one or more devices configured to collect, organize, and dispense expansion content.

Many encoding formats are possible, beyond what is illustrated in FIG. 1, which is merely one example.

Preferences for a sender or recipient may be further specific to particular dates, days of the week, locations, special occasions, and so on.

The system 102 expands text messages from a sender into messages to one more recipients. One or more of the recipient messages may be expanded based on the encoding of the received message. Some messages may not be expanded at all if they don't comprise encodings for expansion.

The sender may thus send text messages which results in larger text messages or other content types to the intended recipient, including images, videos, animations, and so on.

The sender communicates a text message 104 with encodings, and the system 102 expands the text message, and presents the expanded message(s) to one or more recipients. The system 102 may be implemented by the sender device, receiver device, an intermediate message server(s), or a combination of one or more of these. The intended recipients themselves maybe be encoded in the body of the text message, for example, using recipient codes. In this case the text message 104 may be directed to an intermediate system that resolves the recipient addresses from the codes, and forwards the text message.

Expansion Based on Historical Activity

Figure 2:
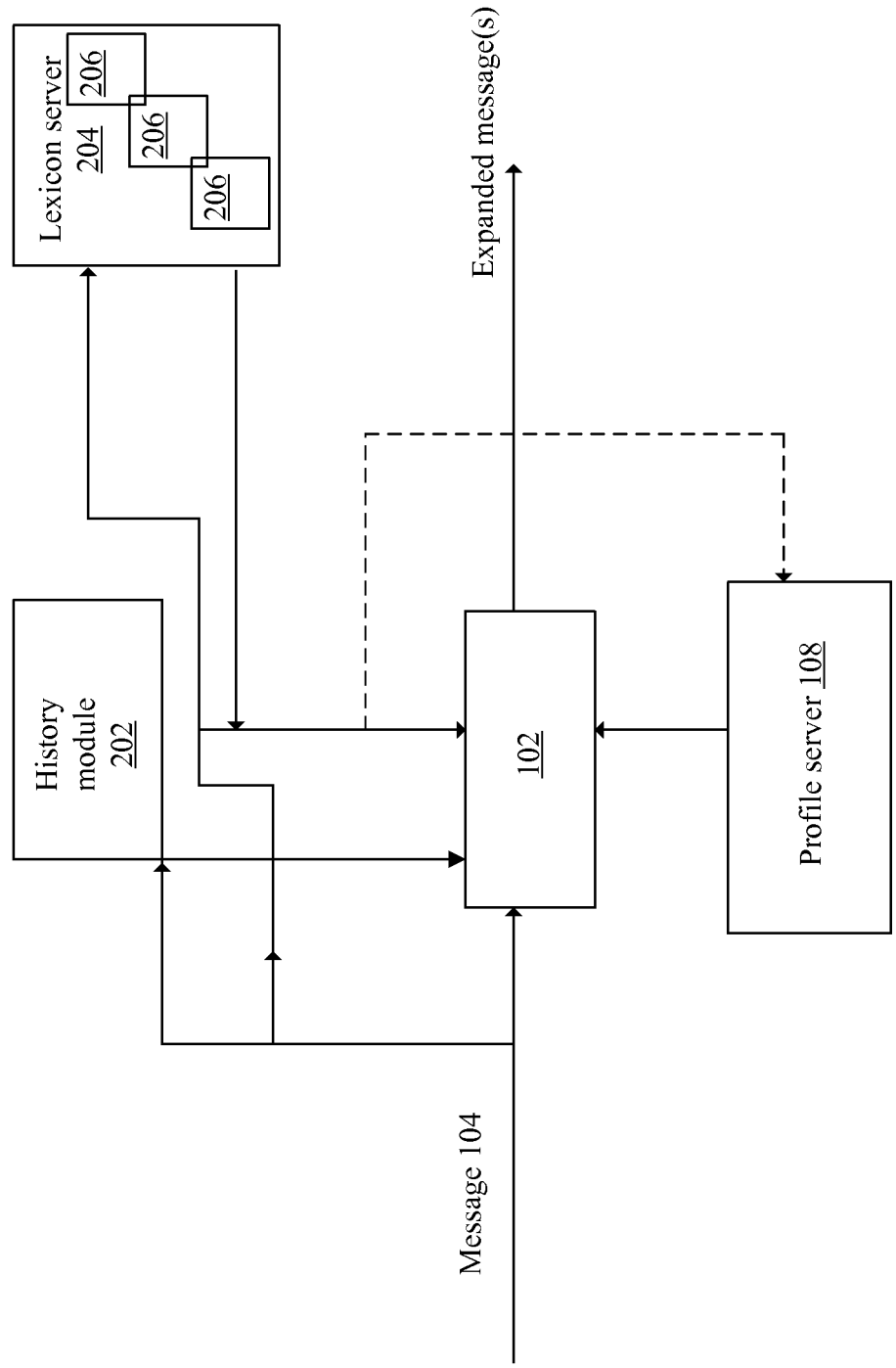
FIG. 2 is an illustration of an embodiment of runtime system logic for applying user profiles and/or messaging or content usage history to an expansion of a text message.

The system may monitor text messages over time, and based on the accumulated history, determine which content or what types of content or rules for expansion. The rules may be derived from and specific to a particular sender, recipient, or interaction between a particular sender and recipient. One example of such a system is illustrated in FIG. 2. The system may use the accumulated history of a particular sender and/or recipient, a group of senders or recipients, or all senders or recipients that the system monitors, to determine which expansion rules or content to apply to a particular message. Another feature allows users to specify and configure their own expansion file. The user composes a text message including encodings and associates, in that same or different text messages, or via another mechanism (such as an expansion file building application), the rules for expansion or substitution. For example, a user may compose a text message with the symbols: "{FYI=New information:GEN} {Iv=I've:All} got the go ahead on the offer". The system may expand this and future messages as follows. To the specific recipient encoded by "GEN", 'FYI' is expanded to 'New information'. To anyone else, 'FYI' is not expanded (unless expansion rules for FYI are specified for other recipients as well in the same or different text message). 'Iv' is expanded to 'I've' for every recipient. The rest of the text is not expanded.

Advanced systems implemented on cell phones may build interaction history logic 202 based not only on text messages, but also on voice interactions (using voice recognition logic to convert and parse the voice signals exchanged in a voice call). Some systems may even monitor application usage on the phone (browsing, gaming, chatting, etc.) in order to construct history logic.

As illustrated, a system following these principles may be implemented using a logic block "lexicon server" 204 which provides interchangeable sets of rules and content to apply to expansion of text messages. The lexicon server 204 may receive text messages and forms logic to store the rules and content for expansion, and thus enable a system that learns expansion rules and content from a text message history. The rules and optionally the expansion content may be packaged by the lexicon server 204 into modular and selectable expansion modules 206. A selected expansion logic module may be provided from the "lexicon server" to the runtime system 102 to customize expansion to a sender, a receiver, a particular text message, or other circumstances as described herein.

By way of example, an encoding in a text message may be translated to a famous quotation, inspirational or motivational saying, etc. The actual content may be substituted for the text message, or else a link to the content may be substituted or added to the text message (a "link" being a URI to a network file or files that include the expanded content). Encoding in a text message may be expanded into larger media and communicated via email or techniques other than SMS (e.g. EMS, MMS, email, or HTML).

Figure 3:
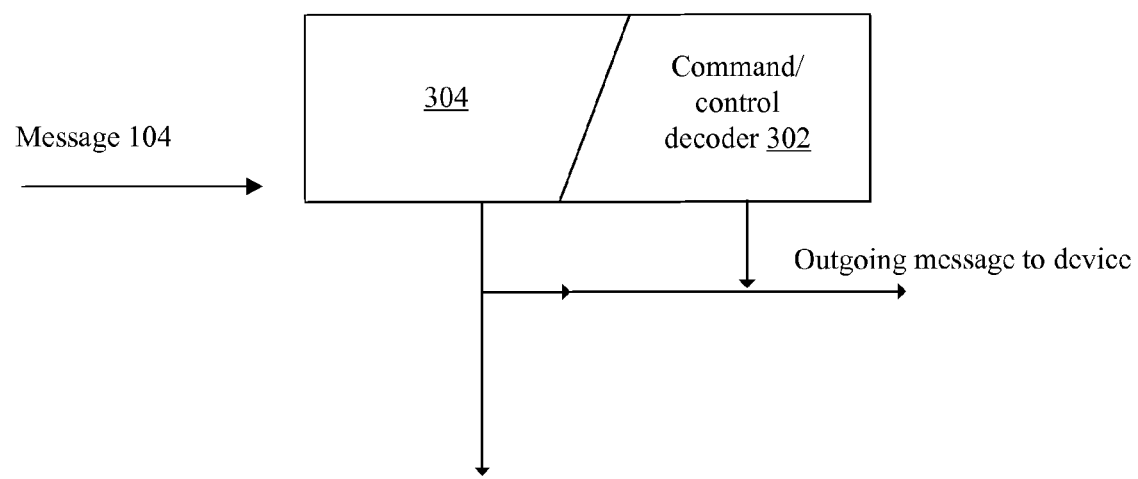
FIG. 3 is an illustration of an embodiment of a text message including addresses and commands and/or control codes.

FIG. 3 illustrates that a text message may be expanded into one or more recipients (where one recipient may be an intermediate message server). The encodings in the text message may be expanded into command/control logic for a remote device, not limited to command and control for purposes of displaying content, but also for example for controlling appliances, lighting, alarms systems, and other remote devices. In this example, a logic block "command/control decoder" 302 receives the text message 104 from a text message interface system 302 (e.g., a device with a phone number, URL, or other network address) and performs the translation into commands to the device.

Figures 4, 5:
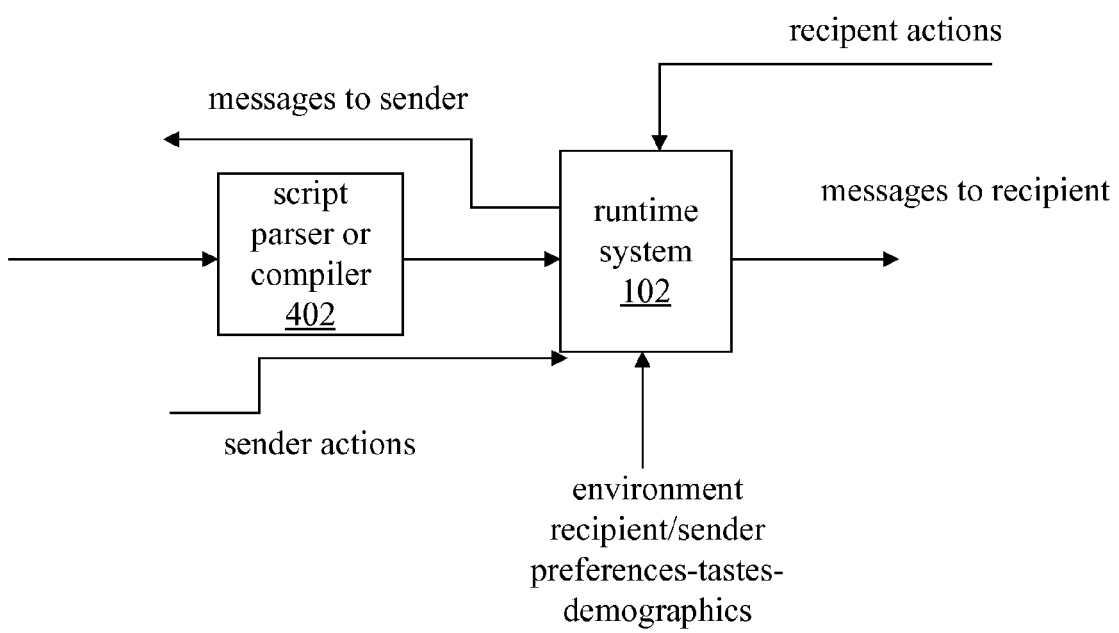
FIG. 4 is an illustration of an embodiment of runtime system logic for interactive and conditional messaging.
FIG. 5 is an illustration of an embodiment of script logic.

FIG. 4 shows a system for interpreting scripts transmitted via text message. The scripts may be applied for various purposes, including complex content presentation and interactive message sessions between a sender and one or more recipients. Interaction may take place between two or more parties via additional text messages generated as a result of executing the script. The script may be also applied for tasks such as remote device automation, data management, etc. Herein, 'script' refers to logic embodying procedural or conditional rules and actions.

A script is communicated from a sender device to a recipient device or intermediate message server 302. The sender device, recipient device, or intermediate server 302 may translate the script into a native command set for the receiving device or server. "Translate" means to generate commands for the receiving device to execute, such as commands to retrieve and display content using certain effects and under certain conditions. The runtime system logic 102, upon executing the script instructions, may communicate multiple messages to a recipient, including text messages, emails, or other content such as user interface commands or components. The recipients may, upon receiving these messages, provide their own actions, or responses. Indications of these actions may be communicated back to the runtime system logic 102 in an interactive fashion. The runtime system 102 may, in turn, communicate messages back to the sender of the script, resulting in a fully interactive messaging session. "Runtime system logic" or "runtime system" refers to logic to carry out actions of a scripted or interactive messaging system as described herein. Runtime system logic 102 may be embodied in the sender, recipient, or intermediate message server devices. The runtime system logic 102 may perform expansion of encodings as described throughout this specification.

The runtime system logic 102 may further receive and apply environment signals from various device sensors or logic that tracks the passage or state of time or current events as embodied in machine logic. Environment signals may be embodied by logic that is applied to determine expansion content or to evaluate conditions specified in a script. Examples of environment signals include the calendar date, the time of day, whether or not it's someone's birthday, weather conditions, or current events.

FIG. 5 is an example of a script embodiment. It's merely one example to illustrate how scripts may be specified using very short amounts of symbols that by way of their position or values or encoding may have expanded meanings (including content, actions, and expansion rules) associated with them. Symbol "cb" indicates to the runtime environment that this is a message of congratulations for someone's birthday. The question mark (?) indicates that if the recipient responds with a "thank you" indication, the system responds with a "you are welcome" acknowledgement. The congratulatory birthday message is not explicitly defined; thus it will be selected by the system based on the logic applicable for such selection, which could include information in about the recipient's preferences, demographics, tastes, and so on, or on such factors for the sender, or on environmental factors. The symbol (2) is encoding for the response of "thank you", that may be provided by recipient to the server in response to receiving the birthday congratulations message. A "thank you" message from the recipient might be generated by clicking a "thank you" button placed in a graphic user interface along with this congratulatory message (again, due to execution of the runtime system logic), or it could be a response to a text message of "thank you" sent by the user to the runtime system. The symbols r (W6) specify that the runtime system should respond to such a "thank you" indication with a "you are welcome" response indicated by the symbol 6. There may be multiple possible "you are welcome" responses and this symbol (6) indicates that a specific one should be applied. If a "w" had been specified without the 6, it might indicate the system should select a "you are welcome" message from among the options therefore.

The expansion of a text message may vary according to when the message is opened by the recipient, where it is opened, what time it is opened, how the presentation progresses interactive actions by the recipient during presentation, or capabilities of the recipient's presentation device or devices (for example). This may be accomplished by 'late binding' the expansion at the recipient device to close to the time the message is opened by the recipient device. 'Opened' means accessed for display or other presentation of the content of the message on a display or sound device.

A text message expansion may include user prompts (visual or audible indications that a response is called for) for actions by the recipient. For example, a text message expansion may include graphical elements, such as buttons or selection boxes, such as radio buttons, text boxes, etc., from which the user may make selections or perform actions which are then propagated back to the runtime system and which are interpreted by the run time system and which may result in the evaluation of conditional statements or statements designed to react and respond to the recipient's actions. A session or message context may be created for messages. The session may be initiated upon receiving the message and may progress through interactions between the recipient(s) or sender. The sender or recipient may send additional messages within the context created by the initial message. The session may time out or terminate upon certain conditions, such as non-response from the recipient or the sender if such responses are expected by the context.

Figure 6:
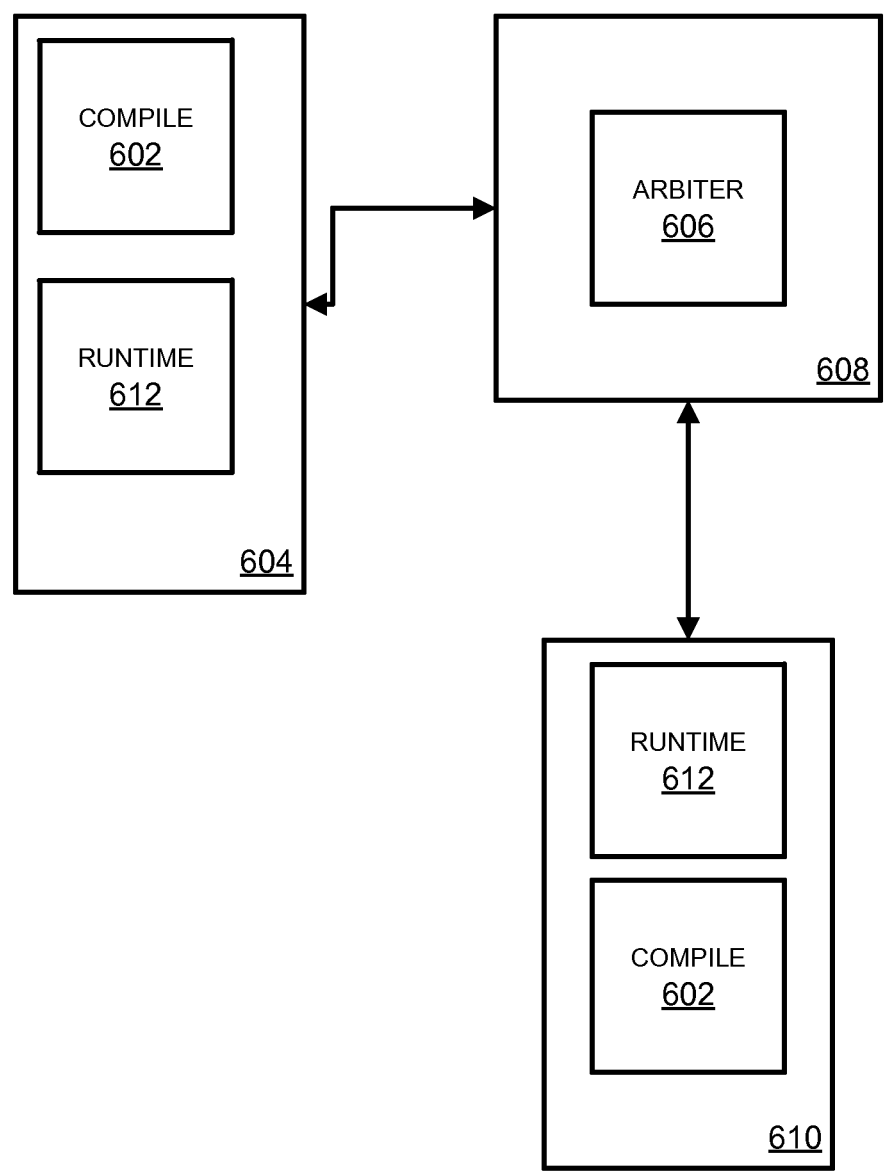
FIG. 6 is an illustration of an embodiment of communication system logic.

FIG. 6 is an illustration of an embodiment of a communion system. Two end user communication devices 604, 610 exchange messages via an intermediate arbiter 608. The arbiter 606 may be part of an intermediate message server, or part of one or more of the devices 604, 610. The arbiter 608 comprises logic for functions such as expansion of symbols in text messages, execution of scripts, and interactive messaging sessions. One or more of the communication devices 604, 610 may include a compiler 602 and runtime logic 612. A text message entered at either communication device 604, 610 may be compiled using compiler 602 to check for syntactical errors, for example. The original or compiled text message (which may comprise for example a script) may be communicated via the arbiter 608 to the other communication device where it may be executed by the runtime 612. The arbiter 606 may expand the compiled information or original script into one or more messages including larger content than comprised in the original message. The runtime 612 and arbiter 606 may operate cooperatively to provide a multimedia experience (which is possibly interactive) to one or both participants in the communication system, where the participants themselves communicate via short text scripts.

A mobile devices' GPS or other location function may be employed during expansion of a text message. For example, an end user device may detect the presence of a WiFi hotspot or other wireless access point associated with a personal, social, or business setting, such as a coffee shop, a store, an office, a home network, and so on. The user device may make the association between the setting and a network or other machine address of the access point, or other identifying information. The identification of the setting may come from the wireless access point or another mechanism, such as a wireless router, bridge, GPS coordinate, and so on. In any case, the device's location or identification of a setting may be provided to the runtime system which may perform expansion on a text message, where the expansion rules and content vary according to the device's location or setting (business, personal, social).

In another embodiment, a text message expansion varies according to a domain destination of the text message. In another words, the text message may have a recipient that is not an end user device, but instead a URL, such as a Twitter® account, a Facebook® account, and so on. The text message may be expanded according to rules and replacements that depend upon the domain destination of the text message (e.g. an IP address, URL, or other indication of a web site or domain). In such applications the destination domain may include logic readily adapted from the description herein in conjunction with a recipient end user device. The text message may also be expanded differently according to application logic that is to receive the message. Examples of application logic include email programs, calendar programs, project management programs, spreadsheets, and voice mail. Again, the destination application logic may function in a similar role to the one described for recipient end user devices.

a. In another embodiment, the system expands emoticons in a text message into larger content, where the emoticon is essentially just an encoding symbol.

In one embodiment, a facility is provided for allowing people to post text messages including possibly scripts to web pages from a mobile wireless device. Virus checking features on the site or an intermediate system may prevent malicious code or scripts being uploaded. The scripts or messages then execute and are expanded off the web page when it is loaded by a browser; or in the case of messages without command/control or conditional logic, the message may be expanded upon being posted to the web page.

A text message may be expanded according to rules or content selected differently, according to a destination website, IP address, uniform resource locator, or recipient.

The text message may encode a media play list. The encoding may include sequential letters from the name of an artist, band, media title, lyrics from the media title, acronyms for the artist, title, lyrics, etc as well as codes for presentation parameters, sequence, special effects and so on.

Initials or other codes for recipients of the text message may be embedded in the text message body. The text message may expand the codes (e.g. initials) into the recipient's names, nicknames, etc. and which further identifies the recipients text message, email, or voice mail address and communicates the expanded message (or portion thereof) to them. The text message may include delimiters to indicate which portions are for which recipients, for example: <LAM follow up with me tonite><KAL expect a call tonite from LAM>. In this example, the first segment < > of the message body may be expanded and communicated to recipient LAM, and the second segment < > may be communicated to recipient KAL.

The system may expand a text message to a length beyond which will fit in a text message to the recipient(s). In this case, the system may convert the text message to voice or email and call or email the recipient(s) with the message(s).

Figure 7:
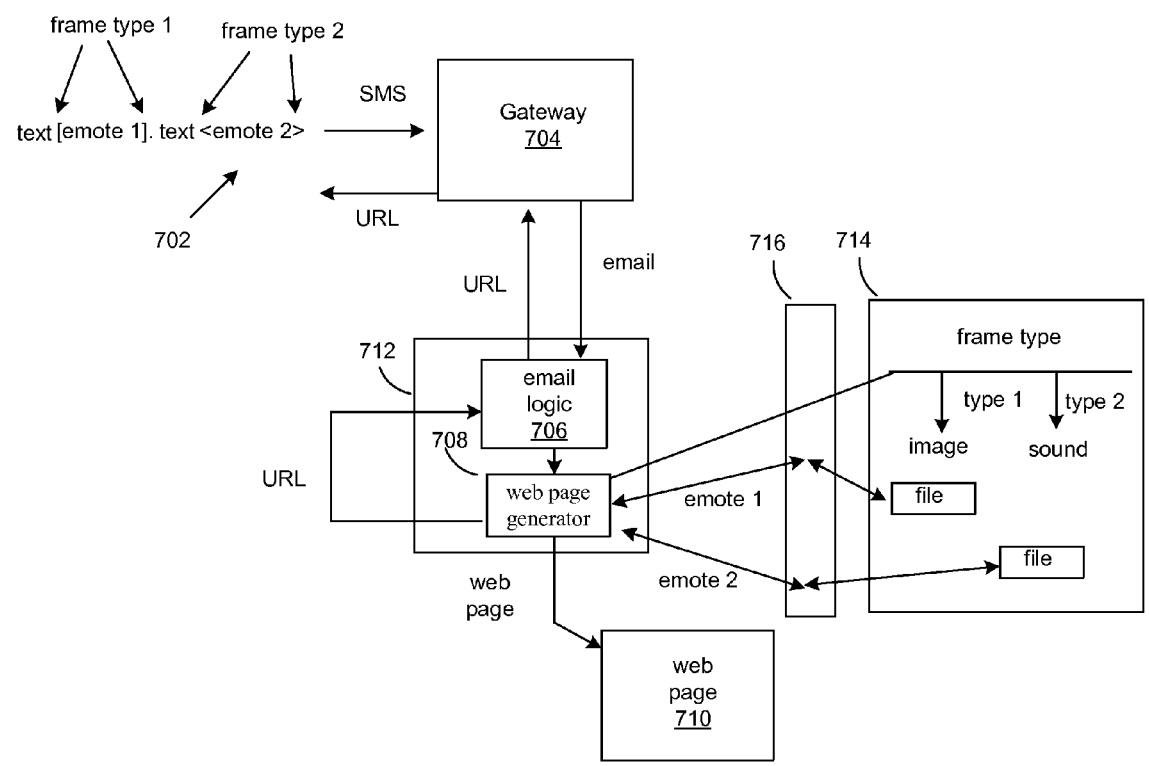
FIG. 7 is an illustration of a system and process for encoding a multimedia script in a text message.

FIG. 7 illustrates an embodiment of a system and a process for encoding multimedia scripts in text messages. A text message 702 includes media frames and emote codes, emote 1 and emote 2. The media frames have different types. Frame type 1 is a square bracket and indicates that the enclosed emote code refers to image content. Frame type 2 is an angle bracket and indicates that the enclosed emote code refers to audio media content. The SMS message 702 encoding the multimedia script is communicated to a service gateway 704. The gateway 704 is constructed using known techniques and technology, e.g. servers, routers, and so forth. The gateway 704 converts the SMS message 702 into an email message. The email message is communicated to a server 712 (one or more devices implementing a server system), which includes email logic 706 to receive the email from the gateway 704. The email logic 706 communicates the email with the script 702 to a web page generator 708. The web page generator 708 parses the script 702 and accesses one or more databases 714 for the different frame types, type 1 and type 2. Names and/or paths for files comprising the media content corresponding to moods (happy, sad, confused, angry, etc) associated with the emote codes emote 1 and emote 2 are identified from the database 714. Logic 716 identifies one or more files of the matching frame (media) type associated with the mood corresponding to the emote code. The file content is embedded or referenced from HTML in a web page 710. An URL identifying the web page 710 and how to access it from a web browser is communicated back to the email logic 706. The email logic 706 communicates the URL to the gateway 704, which converts it back to an SMS message to the device that transmitted the original encoded script 702.

An example of a text message defining a multimedia script (in this case, a single or a sequence of web page(s)) is:

Happy Birthday Linda!%:-)%Keep dreaming[:-D]<:-)). You're the best

The system may create a web pages displaying the text "Happy Birthday Linda!" and, in response to the emoticon :-) in %% which follows or precedes the text, applying a happy theme or mood to this text (e.g., bright color, playful or upbeat font and font presentation, etc.) A font presentation is a display attribute for the font, such as bold, italic, the type of the font, a direction or effect applied to the font (blinking, highlighted, following a curved display axis, etc.)

The system may create a second web coded display to follow the presentation of "Happy Birthday Linda!" (e.g. automatically, after a predetermined time interval) in slide show fashion, or to appear on the same screen as the display of "Happy Birthday Linda" at the same time or some time later. This second display of content will include the text "Keep dreaming" and an image/icon [ ] fitting to an elated or laughing mood or theme, due to the emoticon :-D. The system may play a happy sound < to follow or concurrently with the presentation of "Keep dreaming" and the image, in response to the emoticon :-). This may be followed by or happen concurrently with the display of the text "You're the best" in a neutral fashion (since no mood or emotion element is associated therewith).

Expansion Templates and Layouts

Templates and/or layout information for a multimedia script/web page(s) encoded into a text message may be specified using individual text characters arranged into pictorial elements in the text message. "Pictorial elements" are one or more characters arranged to look to the eye like a feature of the content they are describing. For example, emoticons are an example of a pictorial element. The subject, mood, theme, purpose, topic, taste, or category of a layout or template for web page content encoded into a text message may be specified using pictorial elements. In one embodiment the layout is a "skin" for the content. A skin is a custom graphical appearance achieved by the use of a graphical user interface (GUI) that can be applied to the multimedia content/web page(s) defined by the text message to suit the subject, mood, theme, purpose, category, topic, or tastes of different users. A skin may be associated with themes. Examples of content features that may be associated with a layout/template/skin are borders, background and foreground colors, position and/or size of content elements such as images or text, view panels, logos or icons, and so on. A layout (which may be separate from or included in a template or skin) is a spatial organization for arranging content on a display surface. The layout may be specified separately from a template and/or skin, and from the content, so that a same layout may be applied to multiple different sets of content, multiple different skins or templates, and vice versa. An example of a pictorial representation of a layout includes a plus sign (+) indicating a four quadrant content layout. A one or more colons (:) may indicate columns of content where each period in the colon represents position for content arranged in a vertical column. A layout can be represented by the shape of capital letters or other individual characters. For example, a V may indicate a "V" shaped layout for content (e.g., two images or icons positioned on left and right top positions, one positioned bottom center). Likewise, an O may indicate a circular layout for content. A B may indicate a left-justified two-section vertical layout, and 8 may indicate a two-section centered vertical layout. There are just a few examples of layout definition in a text message using pictorial elements. Lines (--) and under bars (_) may be used to define areas in a layout for content. A caret (^), greater than (>), and less than (<) may point to display locations for content in a layout (effectively enabling customized or modified layouts).

The following example shows a layout applied to a multimedia script:

/+/Happy Birthday Linda!%:-)%Keep dreaming[:-D]<:-)). You're the best. Eat some cake for me![:C]

A four quadrant layout // is specified using a + symbol. The four items of text content and associated images/icons will be displayed together in a four quadrant layout on a single web page display. The last image [ ] emoticon :C indicates an image/icon with an eating, drinking, or consuming theme.

Content from Text and Emotes

Figure 8:
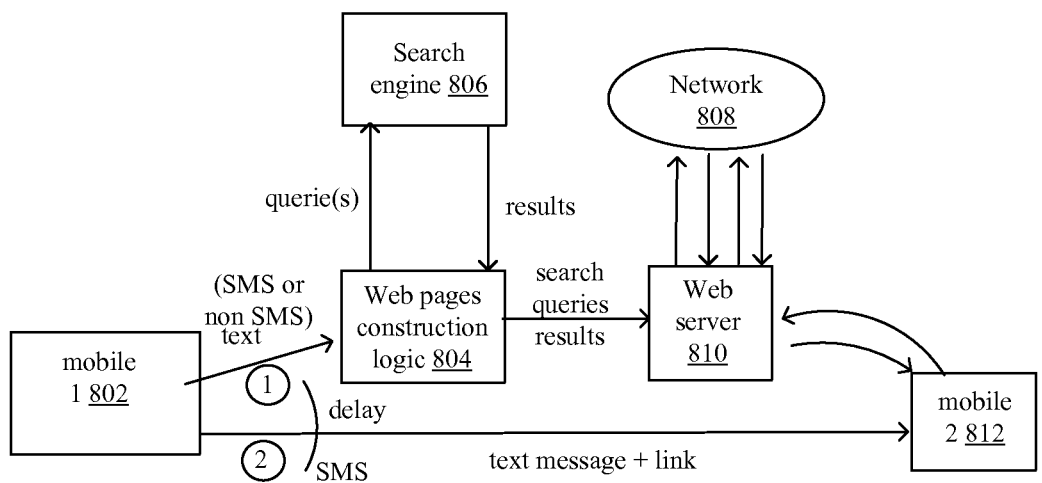
FIGS. 8 & 9 & 12 illustrate embodiments of systems and processes for generating one or more web pages from a text message and providing a link to the web page to the text message recipient.
Figure 9:
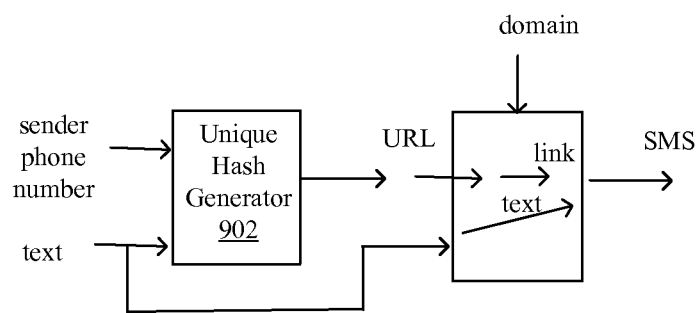
Figure 12:
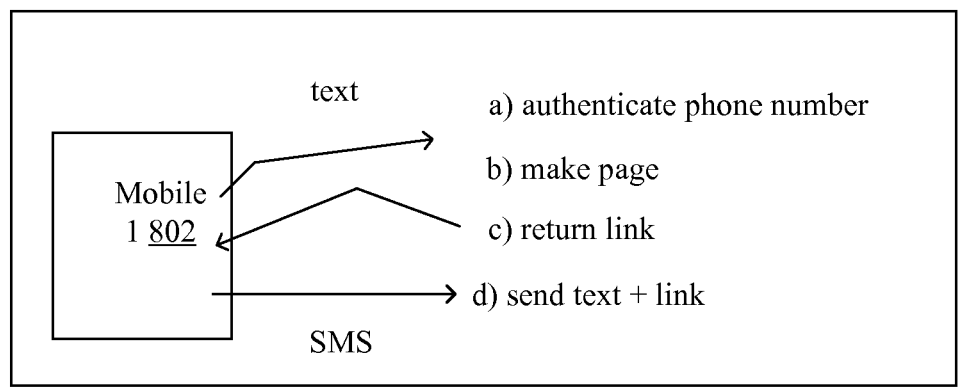

FIGS. 8 & 9 & 12 illustrate embodiments of systems and processes for generating one or more web pages from a text message and providing a link to the web page to the text message recipient.

In one embodiment, content for a multimedia presentation is searched from key words or phrases in a text message combined with key words for an emote. The key words or phrases for the emote are for example a common name for the emote, or the emotion it represents, or the expression or gesture it represents. For example, a text message that says "Happy Birthday, Ann" followed by ":-)" may result in a search expression being provided to a web search engine 806 that includes "Happy Birthday" and "smiley face". One or more images from the search results may be selected based on available copy rights or other criteria, such as a suitability or match to both terms. A webpage may be generated (e.g. web page generation logic 804) with the text "Happy Birthday, Ann", composited with or juxtaposed to the image of a happy face. In one embodiment, a collage of content matching or being returned from the query generated from the text message and the emote is generated based on the results of the search. Micro-payments to content owners may be accumulated for content used in webpages or multimedia presentations generated from text messages, where the micro-payments are based on how often the image is actually used or viewed in a webpage or multi-media presentation generated from a search string that includes text from a text message and one or more emotes.

In one embodiment, a layout template for the generated web page(s) is specified using standard ASCII display characters as "pictorial representations". "Pictorial representation" are ASCII display characters arranged into a visual layout that usually resembles the layout for the content on the page(s). The layout is a spatial organization or pattern for arranging content on the display device. The content itself may be separated from the layout, and one layout may be applied to multiple sets of content. Multiple layouts may be applied to one set of content to produce different visual display formats. An example of a pictorial representation of a layout includes a plus sign (+) indicating a four quadrant content layout. A parenthesis and one or more colons, or simply the colons themselves without the parenthesis, may indicate columns of content, where each period in the colon represents a location for content in a vertical display column. A layout may be represented by the shape of capital letters or other ASCCI characters, for example a capital V could indicate a "V" shape layout. Likewise an O could indicate a circular layout. A capital B could indicate a square layout on top of another square layout and 8 could indicate a circular layout on top of a circular layout. These are just a few examples of layout definition in a text message using pictorial representation. Lines and under bars may be used to define areas in a layout for content. A caret, a hat symbol, greater than, and less than may point to display locations for content.

In one embodiment, text messages are composed with emotes embedded in one or more places in the text. The text is scanned for subject matter material such as "birthday", "wedding", "let's together to have a drink", "let's meet" at a certain location, and so on. A query is then submitted to a search engine 806 and images, sounds, or other content matching the request are returned. Content identified with both the subject matter of the text, and a mood, expression, gesture, noun or verb associated with any emote(s) included with the text, or that may be derived from the wording of the text. A web page(s) is created 804 from the content that was identified from the search, which can be images, video, animation, sound, and text. Compensation may be allocated to the owners of the content. The content itself may be copied or moved to a special library where copyright has been cleared, and the owners of the content understand they will be compensated each time the content is used in a web page or viewed in a web page. A web page is then generated dynamically to include the content. For example a picture of the bar where somebody has requested to meet, or a picture of the outside of a restaurant that somebody has identified in a text message, or a birthday cake and candles, and so on depending on the text itself and/or one or more emotes in the text.

A link to the web page(s) may be returned to the person (their device 802) who composed the text message, or a link to the web page is retrieved by the device 802 and placed into the text message, and then sent along with the text message, or the link is sent in place of the text message, and the text message itself is placed on the web page (made available for viewing by the recipient device 812 via web server logic 810). The web page or image from the searched content itself may be created from content obtained from a network 808 (e.g., the Internet) by the sender's phone or other device 802, and embedded in the text message. One technique involves sending the text message to a web server 810, which then provides the link back to the phone 802 to include in the text message before it's sent out. Another approach is to create a hash value (hash value generator 902) from the phone's subscriber or hardware ID or other unique identifier, such as the sender's phone number, plus the text of the message itself, and use that information to create a unique URL that can be sent in the text message to both the recipient and to the server 810. Or, the server can determine the URL from the text and sender's phone number. A web page may then be created on the fly before the recipient receives and opens the text. This may involve sending the text message to the server first, then sending the URL to the intended recipient of the text message, after a pre-set delay. If the recipient receives the message including the link before the web pages are created due to delays in the network, the web page can say, for example, "please wait, your web page is being created" and then direct them to the page once it's created. This would require some server side engineering which would create a temporary web page which would then redirect to a final web page when the server 810 indicated the final page was ready.

Communication of the text and/or device identifier such as a phone number from the mobile device 802 to the webpage generator 804 may be accomplished using SMS or some other data technology such as internet IP protocol. A URL may be computed from the text and unique identifier by the mobile device 802 and the webpage generator 804 independently or they may cooperate. One or more of them may generate the URL name and communicated to the other. The mobile device 802 may then communicate the text via SMS including the link or just the link to the second mobile device 812. A delay may be used between communication of the text from the mobile device 802 to the webpage generator and communication of the SMS to the final recipient. In this case only unidirectional communication is needed between the mobile device and the webpage generator 804. Bidirectional communication is available for example via a data link to the internet, then the webpage generator 804 can send a confirmation signal that the webpage has been generated back to the mobile device 802 at which point the mobile device 802 can send the SMS to the final recipient including the link.

Figure 10:
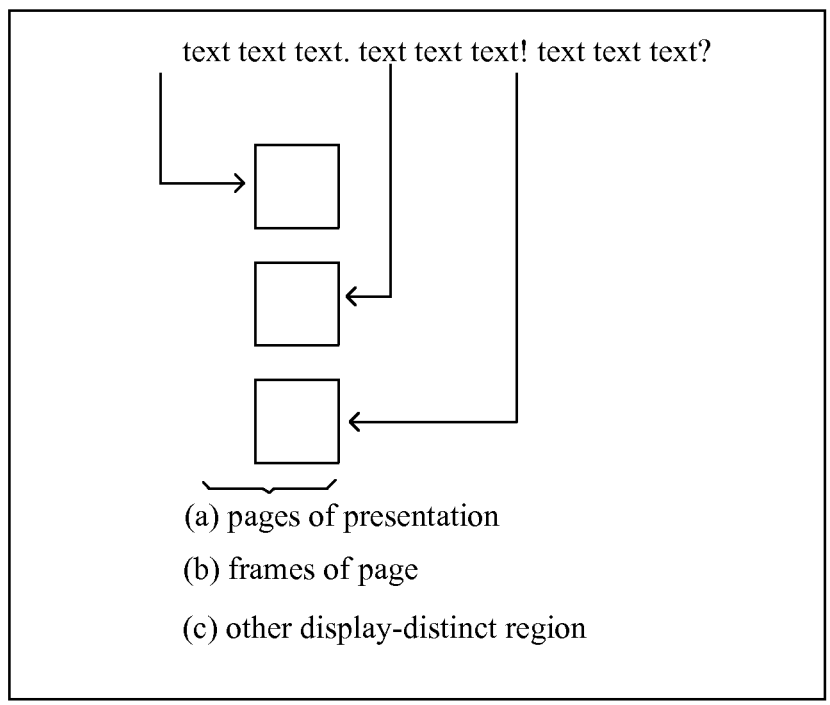

Punctuation may be used to mark the delineation of presentation sections in the layout (FIG. 10). Presentation sections can be different pages in a multi-page presentation that can be frames of a single or multiple webpage or other display-distinct regions as defined at the display layout, for example an ASCII character providing a pictorial representation of a layout. More sophisticated techniques may also be employed to determine display areas for the content of the webpage generated from the text message. For example, natural language constructs such as non-verb groupings, ad-verb groupings and verb adjective noun groupings may be identified in the text message and used two defined different display regions for content.

Emoticons may define the mood or emotion of regions of a text message. Thus, they may affect the expansion of the text message, depending on the extent of the region they are applied to. FIG. 11 illustrates that emoticons may have scope rules associated with them. The scope of an emoticon may be global to the entire message, or local to a region of the text message (e.g., to a noun-verb construct in the message), or they may have an explicit scope defined by other symbols in the message (e.g., a parenthetical expression).

Integration with Social Media Pages and Content

Referring to FIG. 11, a person may compose a text message and select one or more recipients for the text message. The text message is "sent". However, the text message is not sent to the recipients. Instead, the text message, along with identities of the recipient(s) and the sender, is sent to a server system (e.g. an Internet-accessible server, or a server accessible in a wireless carrier network). A web page, or an image (picture), or a multi-page or multi-frame presentation, is generated from the text message, in one or more of the manners described herein. The server system uses the recipients' phone number, or other identifying information, to identify and authenticate to their social media account (e.g. their Facebook™ page), using, for example a database that correlates phone numbers to social media accounts for the sender and/or the recipient. A link to the generated web page, or an image (e.g. a collage or overlay image including words of the text message) is posted on the recipient's wall, or the sender's wall shared to the recipient's wall, or, if posting on the recipient's wall is not allowed due to permissions, an email may be with the link or the image attached. In other cases, the image or the link may be posted on the sender's wall and shared to the recipient's wall or may be posted or uploaded to the sender's account but not posted on their wall, but rather uploaded to their social media site, but only to an image library or album, not posted to their wall, and from the library or album shared to the recipient's wall, or otherwise provided to the recipient's social media page.

Figure 14:
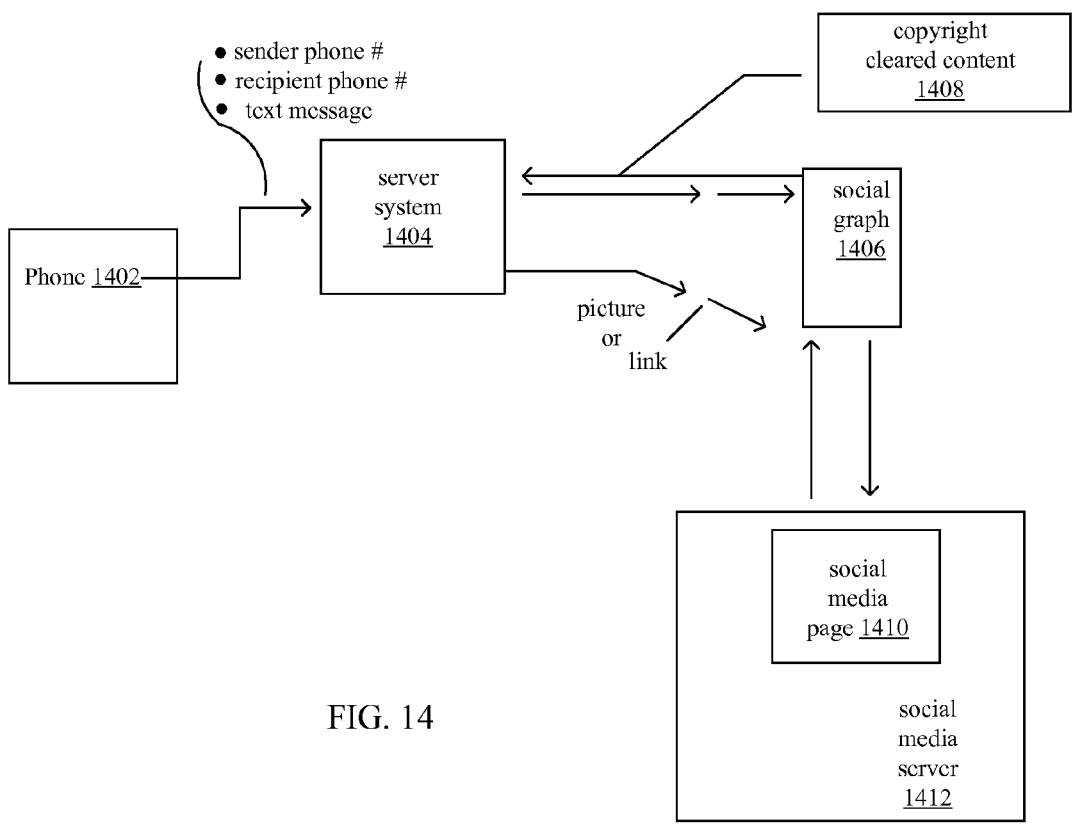
FIG. 14 illustrates a system for interacting with a social media page of a sender or recipient of a text message.
Figure 15:
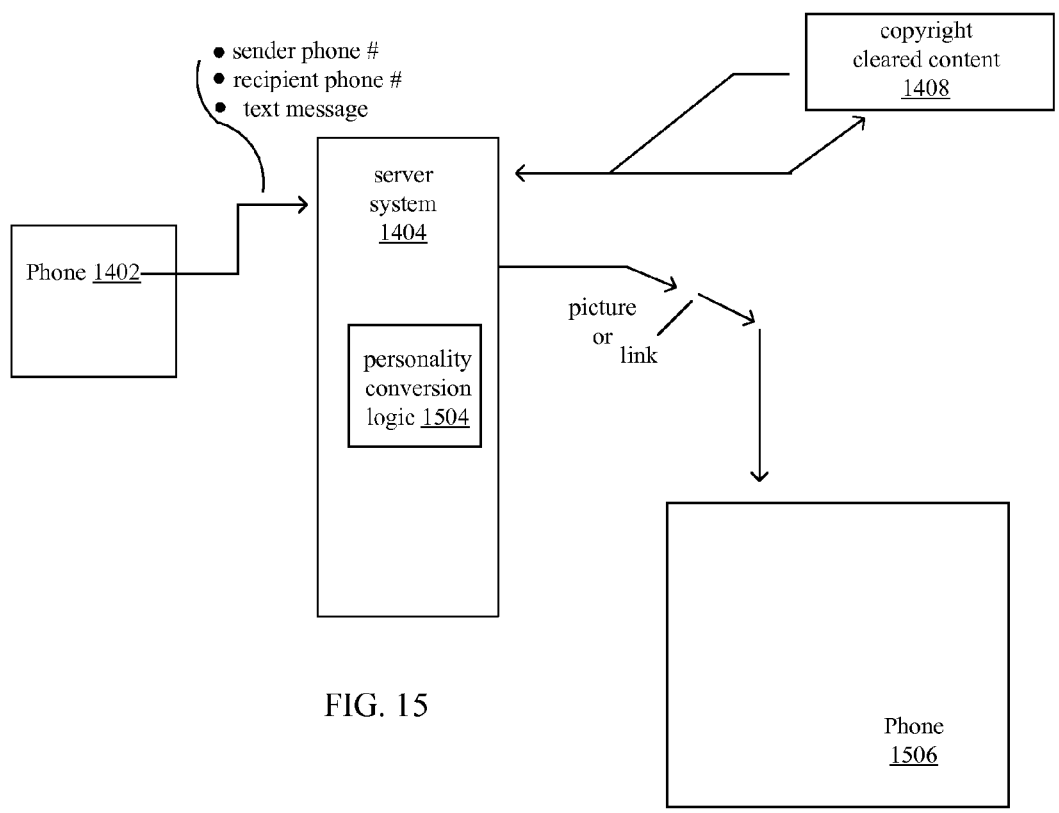
FIG. 15 illustrates a system for converting a text message according to personality logic.

Referring to FIGS. 14 and 15, content for the web page or the image collage that is built based on the text message (from phone 1402 via a server system 1404 implementing features of the runtime content expansion logic 102) may be obtained in a number of ways, depending on the application. For example, the content may be obtained from a copyright-cleared library 1408 of content maintained by the service provider or social media site 1412 (e.g., copyright-cleared web sites accessible via network 808). Alternately, the content may be obtained from the Internet, with a facility in place to identify the owner (entity or person to compensate) of the content, and to provide credit in the form of payment for views or exposures or use of the content. Content may also be obtained from a personal library of the sender of the text message, or recipient of the text message, or both. The content library, if it is personal to a recipient or sender, or if it is a copyright cleared content library 1408, may be maintained by the service provider, or their social media account 1406 where the server 1412, having access to that account, may download content for use in the image collage(s) or web page(s). Using the social media site content has the advantage that the content may be presumed to be copyright-cleared for that social media site, as it would be permitted to be uploaded and stored there initially. Other personal copyright-cleared accounts may include a Flicker account, a Tumbler account, or a Youtube account for the sender or recipient. Audio, animation, video, etc. for the web pages or collages including special effects, musical scores, and so on may be obtained from a copyright-cleared account maintained by the service provider, social media provider, third party etc. as previously described.

Conversion of Text According to Personalities

Figure 13:
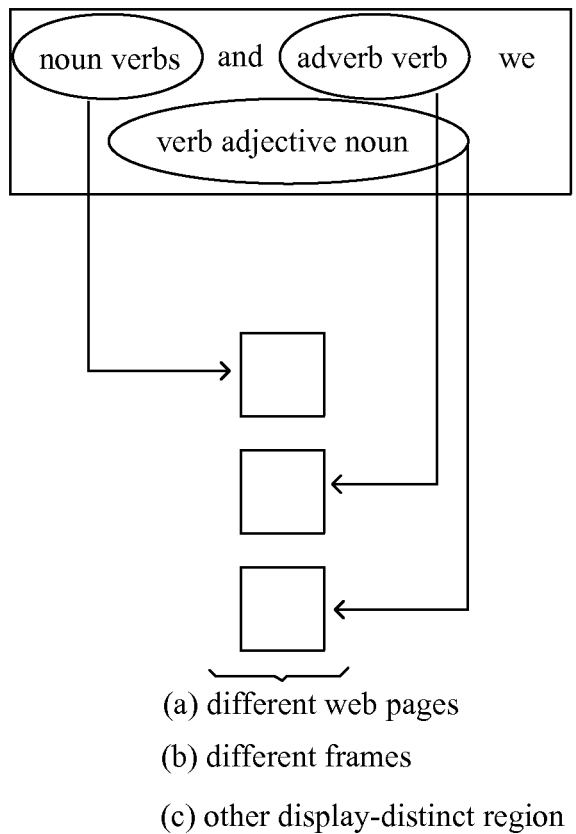

One or more symbols in the text message (or a control in an application that is used to compose/send the text message) may indicate a "personality" to apply to the text message. The mobile device 1402 that is the source of the text message, or a server system 1404 that generates an image, web page, presentation, and so on for the text message, may change the text according to the personality (e.g., via personality conversion logic 1504). If an image, web page, presentation, etc. is generated from the text it may include pictures of or related to objects corresponding to or related to nouns in the text; or it may include pictures of or related to actions corresponding to or related to verbs in the text message; or corresponding to or related to a mood or other theme represented by an emoticon in the text message. The syntax of the message may affect the layout of the web page into which the message is expanded; the message may be parsed for certain syntax constructs, and layout features (frames, DIVs, different pages, etc.) of the web page(s) may be constructed based on these syntax constructs (FIG. 13).

The text of the text message itself may be altered and forwarded to the recipient device 1506 either embedded in an image (or web page, etc), or in conjunction with the image (web page, etc), or separately, where the text is changed according to the identified personality. The personality can be an accent (e.g., a British accent, an American southern accent, etc.), and/or a manner of speaking and phrasing associated with an ethnic group, culture, or location. For example, a "nerd" personality might cause a text message which says "happy birthday" to be altered into text that says "happy celebration of the progression of an earth orbit around the sun through the temporal dimension". The selected personality may be applied to alter the text of the text message and it may be also applied to select imagery or other content to include into a collage or presentation or web page for the text message which may then be presented and displayed to the recipient in any one of the manners previously described herein.

A system to carry out personality translation of text messages (e.g., see FIG. 15) may include an end user communication device such as a cell phone or personal computer and further communication of the text message not by an SMS channel but via a data channel to a server, the server system then applying the personality conversion logic to the text, before forwarding the text message to an SMS gateway through which it reaches another users communication device, or including the text in an image, web page, presentation, and so on. The server may locate content for the text message to include in a web page or collage or multi-page presentation or multi-frame presentation in any of the manners described herein.

Processing in a Network Supporting Wireless Communication

In environments supported by wireless data networks for phones, a text message which has been sent by a wireless device to one or more identified recipients is may be communicated through an SMS gateway of a wireless data network provider, and received by a MSC.

The following description applies to one manner of processing SMS messages in a mobile telephone/device data network built for GSM/CDMA. In such networks, a mobile switching center device (MSC) is the primary service delivery node, responsible for routing voice calls and SMS (e.g., text messages) as well as other services (such as conference calls, FAX and circuit switched data).

The MSC sets up and releases the end-to-end connection, handles mobility and hand-over requirements during the call and takes care of charging and real time pre-paid account monitoring. There are various different names for MSCs in different contexts which reflects their complex role in the network, all of these terms though could refer to the same MSC, but doing different things at different times.

The Gateway MSC (G-MSC) is the MSC that determines which visited MSC the subscriber who is being called is currently located at. It also interfaces with the PSTN. All mobile to mobile calls and PSTN to mobile calls are routed through a G-MSC. The term is only valid in the context of one call since any MSC may provide both the gateway function and the Visited MSC function, however, some manufacturers design dedicated high capacity MSCs which do not have any BSSs connected to them. These MSCs will then be the Gateway MSC for many of the calls they handle. The visited MSC (V-MSC) is the MSC where a customer is currently located. The VLR (visitor location registry) associated with this MSC will have the subscriber's data in it.

The anchor MSC is the MSC from which a handover has been initiated. The target MSC is the MSC toward which a Handover should take place.

The mobile switching centre server (MSCS) is a soft-switch variant of the mobile switching centre, which provides circuit-switched calling, mobility management, and GSM services to the mobile phones roaming within the area that it serves. MSS functionality enables split between control (signalling) and user plane (bearer in network element called as media gateway/MG), which guarantees better placement of network elements within the network. MSS and MGW media gateway makes it possible to cross-connect circuit switched calls switched by using IP, ATM AAL2 as well as TDM. More information is available in 3GPP TS 23.205.

The MSC may connect to the following elements:

The home location register (HLR) for obtaining data about the SIM and mobile services ISDN number (MSISDN; i.e., the telephone number).

The base station subsystem (BSS) which handles the radio communication with 2G and 2.5G mobile phones.

The UMTS terrestrial radio access network (UTRAN) which handles the radio communication with 3G mobile phones.

The visitor location register (VLR) for determining where other mobile subscribers are located.

Other MSCs for procedures such as handover.

Tasks of the MSC include:

Delivering calls to subscribers as they arrive based on information from the VLR.

Connecting outgoing calls to other mobile subscribers or the PSTN.

Delivering SMSs from subscribers to the short message service centre (SMSC) and vice versa.

Arranging handovers from BSC to BSC.

Carrying out handovers from this MSC to another.

Supporting supplementary services such as conference calls or call hold.

Generating billing information.

When a device communicates a text message (SMS message) to another device, the message gets stored in the SMSC (short message service center) which delivers it to the destination device when it becomes available. This is a store and forward option. The SMSC may handle store and forward of SMS messages as well as other SMS operations of a wireless network.

When an SMS message is sent from a mobile phone or other device, it will reach an SMSC which forwards the SMS message towards the destination. Functions of the SMSC is to route SMS messages and regulate the SMS communication process. If the recipient device is unavailable (for example, when the recipient mobile phone is switched off), the SMSC will store the SMS message. It will forward the SMS message when the recipient is available, subject to the validity period.

An SMS message is stored temporarily in the SMSC if the recipient device is unavailable. It is possible to specify an expiry period after which the SMS message will be deleted from the SMSC. Once deleted, the SMS message will no longer be available for dispatch to the recipient device (even if the recipient device becomes available).

The SMSC may be adapted with logic to carry out any of the procedures or parts of procedures described herein for building rich media from an SMS message. The SMSC may also interface with a separate service provider system to apply the text message to create rich media communicated to the intended recipients in accordance with the procedures described herein. In one embodiment, the SMSC first checks if the sender (or in some implementations, the recipient) has an associated data setting that goes with their account information or their phone number or whatever identifying information is associated with the text message or connection over which the text message is communicated. If the setting has a pre-determined value, or if the text message itself includes a certain sequence of characters or other embedded special code, the text message is forwarded to the service provider system for processing into rich media; otherwise, it is simply processed in the conventional fashion by the SMSC and forwarded to the identified recipients.

The service provider system, upon receiving the text message information from the SMSC, processes the text message into rich media as described herein and forwarded to one or more intended recipients. In some cases, however, it may not be possible for the service provider system to complete the processing of the text message, for example if the sender and/or intended recipient has not maintained payment of their account to receive a rich media conversion of text messages. In this circumstance, the service provider will notify the SMSC that the text message was not processed into rich media, and the SMSC will forward the text message in conventional fashion to the intended recipients. Essentially, in one implementation the SMSC may forward an SMS to a service provider for processing into EMS or MMS, which is then returned to the SMSC for forwarding to the intended recipients.

In one embodiment, images, videos, sounds, music and other media to be applied with converting text SMS messages into rich media (e.g., MMS) are tagged not with words or phrases, but with emoticons or other symbols or graphical icons. The media to apply may be tagged (i.e., associated) with words, phrases, emoticons, icons, etc. which are mapped to portions of the text message through a look-up table or tables.

The service provider system may use any of the techniques described herein to locate media content that is copyright cleared for building the rich media message from the SMS text message. For example, an application program interface (API) may be accessed to the sender's (or receiver's) Flicker account, Facebook account, Google Plus account, and so on to locate and copy appropriate images, sound, music, and other media. An interface may be utilized to a commercial copyright cleared database of images, sounds, videos, etc.

In one embodiment, the text message includes one or more words or phrases that are mapped for meaning to identical or similar words or phases or sayings which in turn have associated content from which the rich media may be formed. For example a phrase such as "Happy Birthday" may be mapped to numerous images, sounds, music and so on. The punctuation associated with the word or phrase may be applied to determine more specific media, for example a level of intensity of the joy or happiness represented in the text may by a number of exclamation points, or by one or more emoticons, may result in identification of more specific content appropriate to both the subject and to that level of emotion. A phrase may be parsed for familiar terms or sayings, and then the remainder of the message may be applied to find content to merge or otherwise combine with the content for the familiar parts. For example, "Happy Birthday, Jacob" may result in the identification and use of content corresponding to "Happy Birthday" and then content corresponding to recipient "Jacob", obtained from a social media account or other source. The final result might be a picture of "Jacob" overlayed with a birthday message or poem, and a cake with candles image. A facial photo of the recipient (e.g. Jacob) may be overlayed onto a face location on the birthday content (e.g. a "green-screen" patch).

In one embodiment, images corresponding to a recipient, or corresponding to the sender, or both, are stored or otherwise identified by a service provider, for example via an application program interface to a social network or private image library of the recipient or sender, or in a service provider profile for the recipient sender. The images may be faces or whole body shots of the person. Content is selected for converting text messages to rich media in any of the manners described above, and then the face or other image of the person is selected for superimposing or otherwise combining into the rich media message built from the text message. The face or other image may be selected according to the emotion theme or other indication of mood in the text message. For example, an emoticon that shows happiness, or if the overall mood analysis on the content indicates happiness, may result in selection of a happy face expression for the sender and/or recipient (e.g. by personalizing the emoticons in the message with the sender's or receiver's face, or faces of someone they know or of a pet). This could be selected and merged and blended onto a facial region that is reserved in the other content corresponding to, for example a birthday, anniversary or other event. In this manner highly personalized images for the sender and/or recipient corresponding to the text message content, mood, theme, etc. may be formed and provided. In one embodiment, the images which are superimposed onto the other images are the faces and/or bodies of people, pets, friends, family, etc. associated with the sender and/or recipient. In a general sense, areas of an image corresponding to an identified theme, subject, mood, event, location and so on in a text message may be reserved and marked for the superposition of images of the sender, recipient, or both, or people, or pets, or objects known to be associated with them, such family members, children, pets that are mentioned in the text message or even they are not mentioned which are known to be associated with the sender and/or recipient in which would appropriately be a part of the rich text message due to context, for example for a pet mentioned or something having to do with an animal, or if the theme of the text messages lend itself to a humor that is based on animals or children, or if the text is family oriented, and so on.

In one embodiment, images of objects may be overlaid on defined areas of other content to further personalize the rich media message. For example, objects identified through pattern recognition, or tags in images on a social media account, or Flicker account, or other account of a sender or recipient, or from a commercial image library or from a person's profile with a service provider, may be overlaid on areas of an image, or a video, etc. selected for the text message, to further personalize the image, video or other rich media. For example, if a text message mentions a car, then a media may be obtained which includes an area upon which a car image may be superimposed, and an appropriate image of a car that is owned or preferred by the sender or recipient and/or appearing on one of the images on their social media or Flicker accounts may be obtained, the orientation may be checked using algorithm for that purpose and the car image superimposed on the image.

In one embodiment, the text message is sent to an email address, and is converted at an SMSC and processed as an email. Alternately, it could be received through an email gateway but processed as an SMS on a service provider system. Embodiments using email addresses may be designed to remove the intervention and modification of a wireless service provider SMSC or other network equipment. When the text message is sent to an email gateway, the SMSC may process the text message in the conventional way, forwarding it as email to the domain name specified in the email address. The domain mail server may intelligently extract the recipient name from the email address, or recipient list, and/or identify the sender from the email header, and use this information to locate rich media. The recipient name, or recipient info from the mail header, may be used to look up the phone number of the recipient, so that the rich media may be sent to them using SMS. Alternatively, the rich media could be sent as email. For example, a text message may be sent to an email address such as Jackie@hottext.com. The text message will pass through an SMSC to an email server at domain name hottext.com. The recipient name "Jackie" will be looked up along with the identification of who sent the text message. This combination of information may be used to locate a phone number for somebody named "Jackie" or who is associated with the particular sender, and then the text message converted to a rich media format and either emailed to the recipient if their email address is provided in the configuration, or texted to them as rich media if their phone number is provided.

Figure 16:
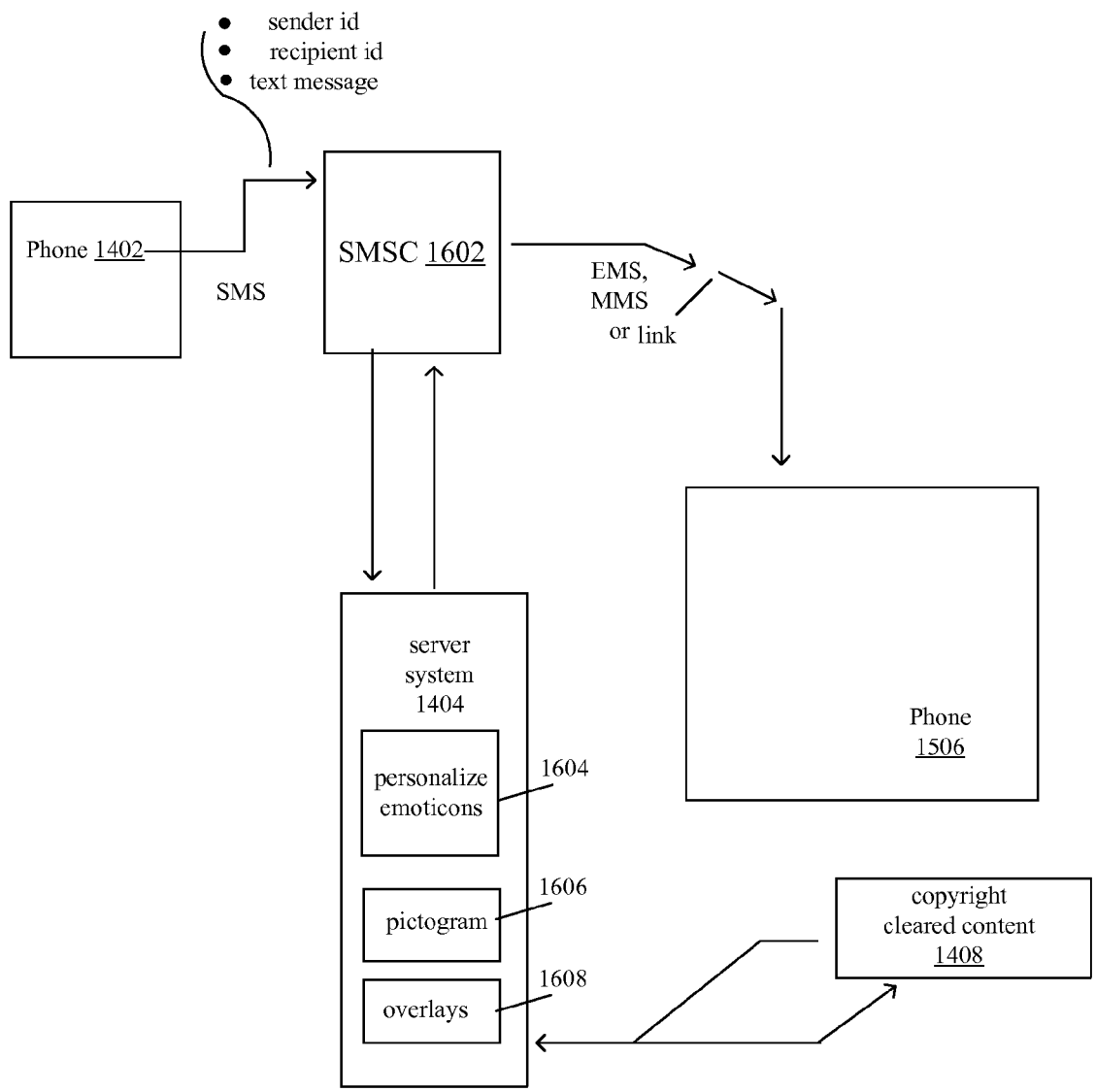
FIG. 16 illustrates a system for converting a text message into personalized emoticons, pictograms, and/or personalized overlays.

FIG. 16 illustrates an example of a system utilizing an SMSC 1602. The system can be used to carry out any of the procedures for processing text messages described herein. Logic of the server system 1404 may be included within the SMSC 1602 in some cases.

Personalized Emoticons

Referring to FIG. 16, in one embodiment, emoticons in the text message are themselves converted into images of the person sending the message or receiving the message (e.g via personalization logic 1604). The images that are selected correspond to the mood, emotion, or theme associated with the emoticon and the person's face. For example, a smiling face emoticon © may result in selection of an image for the sender of the text message which shows them smiling. An elated emoticon :-D may result in a selection of an image of the sender's face showing an elated expression. This facial image may be combined (e.g., overlayed) onto an image representing content, theme, subject, objects, etc. in the text message, or just an image of the text itself with the emoticon overlayed as an icon at the appropriate place. In other words, the text is converted into a graphic image and the emoticon is represented not by its generic icon, but by an image of the sender's or receiver's face expressing the emotion or expression represented by the emoticon. The facial images could also be of people associated with the sender or receiver, or of pets associated therewith, or they could be faces of people or things not associated with either one, but selected specifically to represent certain emotions for the sender or receiver.

The service provider may store or make access to multiple images (e.g. of the sender or recipient, or of a third party, or animals, etc.) each showing different facial expressions representing different moods, themes, emotions and so on. These may be stored in an image library of the service provider, or an online repository of the sender/receiver.

Pictograms

In one embodiment, a text message is converted into an image pictogram of the words in the text message (e.g., via pictogram logic 1606). The conversion of the text message into a pictogram may follow any one of the procedures described herein for creating rich media from a text message. By way of example, a text message that says "Your dress is the bomb" could be converted into a pictogram with a hand pointing outward of the screen indicating "you" or "your" followed by a picture of a dress, with (optionally) a plus sign in between, and then the word "is the", and then a picture of a bomb with a lit fuse. Of course, this is only an example of a pictogram.

In another embodiment, the text message is first applied to a personality profile to convert it into an expression of personality, ethnicity, culture, profession, and so on as previously described. For example, a text message could be converted into a ghetto slang, a pirate personality, an English gentleman personality, a profession, a nerd, and so on. The converted text may be applied to create a pictogram or any one of the rich media implementations described herein. In one embodiment, the user may specify the layout for the pictures in the pictogram by specifying a layout character, characters, or symbols in the text message as previously described herein. In one embodiment, a background image upon which the pictogram pictures are superimposed is selected according to a mood, theme, or subject associated with one or more emoticons, nouns, verbs, adverbs, adjectives, or phrases in the text message (e.g., overlay logic 1608). For example, consider the previous example which says "I think your dress is the bomb". If this was followed by a colon, a dash, and a capital letter D, (the emoticon for exuberance) it may indicate selection of an exuberant background image such as an extremely happy face or somebody jumping up in the air for joy. Images of the pictogram could be superimposed over that background. The emoticons could also be used to pick background music, or sound effects, to go along with the pictogram. In one embodiment, the emoticons themselves in a text message are turned into images that become part of the pictogram. Thus a happy face may be turned into a smiling face image, a frown face emoticon could be turned into a frown face picture, and so on. A difference from conventional approaches is that in the described application, the emoticons in the rich media are not alphanumeric codes, they are pixels of a larger bit map image which includes the text message text. They are part of a larger image forming a pictogram that includes non-emoticon graphics (e.g. text graphics) and possibly other pictorial elements embedded therein.

Other Features and Implementations

In one embodiment, the rules of expansion for a code embedded in a text message include references to network content. This may typically takes the form of URI, but may take other forms such as IP addresses, port numbers and so forth. The text thus expanded may be converted into a image using lay out information embedded in the text message, or a layout associated with a user's profile (either a sender or receiver of the message). The text may be converted into a web page(s) again using layout information associated with a user specified in the text message, or in a profile of the sender or receiver. The URI may point to large passages of text: sayings, phrases, quotes, or poems, for example. Expansions may point to an image, combination of images, or web page(s).

In one embodiment, the context of prior text messages are preserved in a text message session. The session is implemented as instructions and data, i.e. logic, within either devices one of the sender and receiver of the text messages, or an intermediate server based network system.

A subject from prior context for the text message may be applied to generate new images or to select new content for subsequent message expansion. Thus for example a first text message may say "happy birthday", providing context so that a subsequent text message "light the candles" would result in a birthday cake with candles being lit on it being included in the picture or web page that is generated from the text message. The second text message does not reference a birthday cake; however, in the context of the first text message, "light the candles" would be understood to mean that content should be selected illustrating lighting of candles on a birthday cake. Another example involves a first text message that references a particular person, such as Robert or Clara, or "you" or mom or dad. A subsequent text message with a pronoun, (he, she, them, us, we) may be expanded into pictures that represent the pictures or other multimedia content that represent the people referenced by the pronouns, as defined by the context the prior text messages in the session, and perhaps by a user profile or recorded text message history (which might identify images/content with the referenced people in it). For example, a person's father may be referenced by the word "dad" and this may result in a look up of social media information or other content for the person's father as defined or stored by an online system or in the sender or receiver device, and pictures or other multimedia content may be expanded to show that particular party.

In one embodiment, a text message is converted into a pie chart, organization chart, bar graph, x-y graph, flow chart or block diagram. Exemplary encodings for communicating data suitable for such graphical representations using text messages will be readily apparent to those skilled in the art. For a pie chart, the exemplary encoding would be decoded and operated on to produce an image or web page that renders as a pie chart on a recipient device. Organization charts, flow charts, block diagrams, and other graphical tools could be similarly represented in text messages. The particular graphical tool may be encoded into a first text message. The message is communicated to a server system where it is stored. A second text message sent at any point after that which makes references to the code identifying the graphical tool may then be communicated to the server system along with data points. The data points will then be graphically represented according to the graphical tool, once the data set is complete. In one embodiment, the data is directed to the server or directed to a recipient but intercepted and stored on the server, and never communicated to the recipient. The data is intercepted by the server and expanded into rich media representing a graphical tool, such as a pie chart, chart or bar graphics, etc. and then the rich media graphic tool is communicated to the one or more recipients.

In one embodiment, a system and technique for synchronizing rules of expansion for text messages into multimedia content may be updated on a multiple wireless devices as follows: a sender of a text message may send a text message with updated expansion rules embedded in the text message itself. The text message with the expansion rule is sent to the SMC for the sender. The SMC maintains a history of prior recipients and maintains, for example, a history file in the network, accessible from the SMC. The history file includes recipients who received the rule before. Thus the list of mobile devices to update is specific not only to the sender, but also to those recipients who have received that embedded rule from the sender before in a text message. The SMC does not have to perform this function; it could be executed against in a history file maintained on the sender's phone. The sender's phone could keep the history file, identifying which recipients received which rules embedded in text messages in the past, and to update that rule is a matter of updating the rule in the file and would automatically sending updates to those recipients. In one embodiment this may be done by the sender sending himself a text message, the phone recognizes that the sender is also the recipient and looks for embedded codes in the message, extracts them and updates the history file or updates the expansion file and then sends text messages to all prior recipients of that rule and possibly also a rule or recipients specified in the text message if it is not sent to the sender himself or herself. The updated rule is sent to those recipients who received that rules in the past from the sender.

In one embodiment, the text message may include codes which are special symbols that represent session variables or context for a session between the sender and the recipient. Session variables are codes embedded in the text message and can include a code for the recipient's name, codes for the characteristics of the recipients such as their current location, the subject of the text message, a place name, or a characteristic of the recipient or the sender configured in a profile stored on the user device or in the network.

In one embodiment, gestures of the phone, i.e. moving the phone around in a certain pattern in the air or on a surface, or drawing on the phone surface, may be translated into an emoticon or an animated GIF or other animation which then becomes part of the text message. The two or three dimensional gesture or drawing on the two dimensional display surface may be converted into a code which is inserted into a text message and expanded according to the rules of expansion. It may be expanded into an image for example, or converted into a mood for the text message as explained previously and subsequently in this description.

In one embodiment, objects are identified from the text message as well as actions and adjectives. This information is applied optionally along with user configuration preference options for particular objects or for general purposes to a mesh or bone's model of a person, a face, an animal, or other object. In one embodiment, emoticons are applied to a mesh and/or bone's model or other 3-D modeling technology for a phase and/or a body of a person or an animal in order to alter the mesh into a configuration that represents the emotion, mood, or action etc. commonly associated with the emoticons. For example, an emoticon for a smiling face could be applied to a mesh and/or bone's model for a person's avatar to create a happy smiling face on the avatar and/or a happy body position or body position that indicates happiness, such as a cheering position. The mesh model may then have textures mapped to it, perhaps representing the person's face or figures of an avatar that a user chooses, including clothing and other props such as a brief case, depending on the time of day or depending on the person's configuration options or depending upon content of the text message, such as "I am on my way to work" which might result in an avatar which is carrying a brief case to an office building or carrying a brief case or cell phone, and wearing a suit. The generated avatar may then be converted into an image which is sent as an enhanced SMS or multimedia SMS. In one embodiment, verbs or other actions identified from the text message may be applied to alter the body position, limb positions, posture and so on of the bones or mesh model before converted into image. For example, "I am running late" might be converted into a man who is running by altering the position of joints and other date attributes of a bone's model of an avatar associated with the sender of the text message.

In one embodiment, an implementation of such a system may be carried out as follows. A text message scanned for actions and objects. The default objects may be the sender's avatar in a neutral position and expression, or the default object may be the person's avatar, representing the sender of the text message. A verb or other action may be identified from the text message such as "running". A verb may be applied to one or more look-up tables to a series of verb text translations in a bones or mesh model, possibly through an intermediate step joint translation, which is mathematically translated into verb type translations for the model. These translations are applied and other surface mapping techniques are used to apply an outer (skin) or decoration to the model of the avatar, for example by adding closing representative of adjective or indication in the text message that the person is in a location or doing something involving specific dress types. It could be a business suit, in or if they are on the way to a gym, gym clothing could be applied as well as a gym bag. User preferences configured on the server or user device may be applied depending on the time of day, day of week, a GPS location for the person sending the text message and so on to provide a more accurate or more preferred mapping of the avatar's skin, body position, decoration, and additional objects associated with the avatar, such as brief cases, gym bags, umbrellas, etc.

Implementations and Alternatives

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A communication system comprising:
   a text message expander operable to expand a text message from a sending device for the text message into a composite image for display on a recipient device for the text message, the composite image comprising location image content depicting a location identified in the text message, the text message further comprising an emoticon;
   a content enhancer operable by the text message expander to query for the location image content from key words in the text message combined with key words for the emoticon in the text message; and
   the content enhancer further operable by the text message expander to select the location image content based on the key words in the text message and to select a human image depiction based on the key words for the emoticon in the text message, and to superimpose the human image depiction over the location image content to form the composite image.

2. The communication system of claim 1, the human image depiction associated with both of the emoticon and a person associated with the recipient device for the text message.

3. The communication system of claim 1, the human image depiction associated with both of the emoticon and a person associated with the sending device for the text message.

4. The communication system of claim 1, further comprising:
   a web site interface operable to receive the composite image from the text message expander and to post the composite image to a social media web site.

5. The communication system of claim 4, the content enhancer operable by the web site interface to select one or both the location image content and the human image depiction from the social media web site.

6. The communication system of claim 1, the content enhancer further comprising a content personalizer operable to apply a skin to the composite image.

7. The communication system of claim 6, the content personalizer responsive to a selected personality configuration to select the skin to apply, the selected personality configuration associated with one or the person associated with the sending device for the text message or a person associated with the recipient device for the text message.

8. A digital communication method, comprising:
   expanding a text message from a sending device for the text message into a composite image for display on a recipient device for the text message, the composite image comprising location image content depicting a location identified in the text message, the text message further comprising an emoticon;
   forming a query for the location image content from key words in the text message combined with key words for the emoticon in the text message;
   selecting the location image content based on the key words in the text message and selecting a human image depiction based on the key words for the emoticon in the text message; and
   superimposing the human image depiction over the location image content to form the composite image.

9. The method of claim 8, the human image depiction associated with both of the emoticon and a person associated with the recipient device for the text message.

10. The method of claim 8, the human image depiction associated with both of the emoticon and a person associated with the sending device for the text message.

11. The method of claim 8, further comprising:
operating a web site interface to receive the composite image to post the composite image to a social media web site.

12. The method of claim 11, further comprising:
selecting one or both the location image content and the human image depiction from the social media web site.

13. The method of claim 8, further comprising:
applying a skin to the composite image.

14. The method of claim 13, further comprising:
applying a selected personality configuration to select the skin to apply, the selected personality configuration associated with one or the person associated with the sending device for the text message or a person associated with the recipient device for the text message.

15. A computing apparatus, the computing apparatus comprising:
a processor; and
a memory storing instructions that, when executed by the processor, configure the apparatus to:
expand a text message from a sending device for the text message into a composite image for display on a recipient device for the text message, the composite image comprising location image content depicting a location identified in the text message, the text message further comprising an emoticon;
form a query for the location image content from key words in the text message combined with key words for the emoticon in the text message;
select the location image content based on the key words in the text message and selecting a human image depiction based on the key words for the emoticon in the text message; and
superimpose the human image depiction over the location image content to form the composite image.

16. The computing apparatus of claim 15, the human image depiction associated with both of the emoticon and a person associated with the recipient device for the text message.

17. The computing apparatus of claim 15, the human image depiction associated with both of the emoticon and a person associated with the sending device for the text message.

18. The computing apparatus of claim 15, wherein the instructions further configure the apparatus to:
operate a web site interface to receive the composite image to post the composite image to a social media web site.

19. The computing apparatus of claim 15, wherein the instructions further configure the apparatus to:
apply a skin to the composite image.

* * * * *